US008440250B2

(12) United States Patent
Nakano et al.

(10) Patent No.: US 8,440,250 B2
(45) Date of Patent: May 14, 2013

(54) FAT CRYSTALLIZATION ACCELERATOR (75) Inventors: Mikio Nakano, Izumisano (JP); Shigemi Uesugi, Izumisano (JP); Shinya Yamane, Kyoto (JP)

(73) Assignee: Fuji Oil Company, Limited, Osaka (JP)

( * ) Notice: Subject to any disclaimer, the term of this patent is extended or adjusted under 35 U.S.C. 154(b) by 328 days.

(21) Appl. No.: 12/866,569

(22) PCT Filed: Jan. 26, 2009

(86) PCT No.: PCT/JP2009/051202
§ 371 (c)(1),
(2), (4) Date: Aug. 6, 2010

(87) PCT Pub. No.: WO2009/098963
PCT Pub. Date: Aug. 13, 2009

(65) Prior Publication Data
US 2011/0250343 A1 Oct. 13, 2011

(30) Foreign Application Priority Data
Feb. 8, 2008 (JP) .................................. 2008-028290

(51) Int. Cl.
*A23D 9/007* (2006.01)
(52) U.S. Cl.
USPC .......................................... 426/611; 426/607
(58) Field of Classification Search .................. 426/611, 426/607
See application file for complete search history.

(56) References Cited

U.S. PATENT DOCUMENTS

| 2,322,820 | A | * | 6/1943 | Brown | 549/478 |
| 2,996,237 | A | * | 8/1961 | Hines | 229/198.3 |
| 2,996,387 | A | * | 8/1961 | Radlove | 426/611 |
| 3,547,655 | A | * | 12/1970 | Knightly et al. | 426/24 |
| 3,649,647 | A | * | 3/1972 | Masanori et al. | 549/476 |
| 3,795,627 | A | * | 3/1974 | Langhans et al. | 516/30 |
| 3,951,945 | A | * | 4/1976 | Heesen et al. | 536/18.2 |
| 4,209,547 | A | * | 6/1980 | Scarpiello et al. | 426/607 |
| 5,306,831 | A | * | 4/1994 | Beshouri et al. | 549/478 |
| 5,308,831 | A | * | 5/1994 | Fevrier et al. | 505/100 |
| 6,384,248 | B1 | * | 5/2002 | O'Lenick, Jr. | 549/478 |
| 2009/0074937 | A1 | | 3/2009 | Gonus et al. | |

FOREIGN PATENT DOCUMENTS

| CN | 1306120 | 8/2001 |
| CN | 101065021 | 10/2007 |
| JP | 2007-99871 | 4/2007 |

OTHER PUBLICATIONS

Giacometti, J. 1996. J. Agric Food Chem 44:3950.*
Office Action and Search Report issued Dec. 13, 2012 in corresponding Chinese Application No. 200980112226.8, with English translations.

* cited by examiner

Primary Examiner — Carolyn Paden
(74) Attorney, Agent, or Firm — Wenderoth, Lind & Ponack, L.L.P.

(57) ABSTRACT

Provided is a crystallization accelerator capable of accelerating fat crystallization a short time during a production step of a product of margarine, shortening, chocolate, or hard butter to be used for confectionery production or bread production. A phenomenon that sorbitan fatty acid ester having an esterification ratio of from 28 to 60% and a sorbitol-type content of from 20 to 40% exhibits a remarkable effect on acceleration of fat crystallization in a short time was found, and thus, the invention was completed.

2 Claims, 5 Drawing Sheets

FAT CRYSTALLIZATION ACCELERATOR

TECHNICAL FIELD

The present invention relates to a fat crystallization accelerator.

BACKGROUND ART

In a food product containing a fat, the crystallization behavior and properties of the fat exert a significant influence on many situations including development, production, storage, and distribution of the food product. Therefore, a technique for controlling fat crystallization is one of the most important issues in fat-containing food product industries.

Particularly, a fat composition of margarine, shortening, chocolate, or hard butter to be used for confectionery production or bakery production, has a high ratio of fat content in the composition, and therefore the influence of the crystallization behavior of the fat to be used is great to cause various problems.

For example, as a method for suppressing coarsening of a crystal during storage after production, Patent Document 1 proposes a fat crystallization adjustor containing diglyceride for the purpose of preventing deterioration of physical properties caused by the coarsening of fat crystals. In addition, Patent Document 2 proposes, as a method for producing a fat composition in which particulate crystals having a diameter of 20 μm or more are not generated under a long term storage, a method for producing a fat or a fat composition that does not generate particulate crystals by generating unstable crystals through rapid cooling using a coolant of −20° C. or lower or addition of unstable crystal particles of a fat.

These are attributable to the coarsening that occurs when the fat that is not sufficiently crystallized in a production step is crystallized during storage or unstable crystals become stable crystals, and the cause is considered to be insufficient fat crystallization during the production step. Particularly, a palm oil-based fat is used as a fat raw material for a plastic fat composition such as margarine and shortening, but the crystal coarsening during storage is inevitable since the crystallization speed of the palm oil is slow, and therefore, there has been a problem that it is difficult to blend a large amount of inexpensive palm oil.

Accordingly, as a method for suppressing the generation of coarse crystals of palm oil, Patent Document 3 proposes a method for suppressing the generation of palm oil particulate crystals by adding a sorbitan saturated fatty acid ester having an esterification rate of 20% or more and less than 50%. In addition, Patent Document 4 proposes a water-in-oil emulsified fat composition containing a saturated fatty acid-linked sorbitan fatty acid ester and a medium chain fatty acid, wherein coarse crystals are not generated while containing a large amount of palm oil, and Patent Document 5 also proposes a creaming property improver containing a saturated fatty acid-linked sorbitan fatty acid ester as an active ingredient.

However, these proposals focus on the suppression of crystal coarsening during long term storage and do not solve the basic problem of fully crystallizing fat during a production step, and therefore, a solution from the viewpoint of accelerating the crystallization in a short time during a production step has not been offered yet.

Previously, since it has been necessary to add a cooling unit, to increase production steps such as increasing a degree of supercooling while extremely reducing a cooling temperature, and reducing a production flow rate, or to add complicated steps such as a tempering work and a stabilizing step (aging) after production, production efficiency has been deteriorated, and the effect has been insufficient.

Particularly, in a sheet-like plastic fat composition used as being inserted into a dough of bakery or confectionery among plastic fat compositions such as margarine and shortening, the fat crystallization acceleration effect during a production step is most required since insufficient fat crystallization during a production step makes it difficult to perform a work of forming the sheet-like shape and deteriorates elasticity and flattening properties.

Also, in recent years, the use of hardened oil having a high trans acid content has been reduced and the amount of transesterified oil used being increased, but it is difficult to stably produce plastic fat compositions such as margarine and shortening using the transesterified oil, particularly randomly transesterified oil, having a slower crystallization speed as compared to the hardened oil. Therefore, the solution has been in demand.

Patent Document 1: JP 2000-345185 A
Patent Document 2: JP 2001-72992 A
Patent Document 3: JP 2007-124948 A
Patent Document 4: JP 3434463 B
Patent Document 5: JP 2007-97419 A

DISCLOSURE OF THE INVENTION

Problem to be Solved by the Invention

An object of the present invention is to provide a crystallization accelerator capable of accelerating fat crystallization in a short time during a production step of a fat composition of margarine, shortening, chocolate, or hard butter product, to be used for confectionery production or bakery production.

Means for Solving the Problem

The present inventors have made intensive studies for solving the above-described problems, and, as a result, have found that a sorbitan fatty acid ester having an esterification rate of 28 to 60% and a sorbitol-type content of 20 to 40% exhibits a remarkable effect on acceleration of fat crystallization in a short time and have accomplished the present invention.

That is, a first aspect of the present invention is a fat crystallization accelerator comprising a sorbitan fatty acid ester having an esterification rate of 28 to 60% and a sorbitol-type content of 20 to 40%. A second aspect thereof is the fat crystallization accelerator according to the first aspect, wherein the content of palmitic acid and/or stearic acid in 100% by mass of a constituent fatty acid in the sorbitan fatty acid ester is 90% by mass or more. A third aspect thereof is a fat composition comprising the crystallization accelerator according to the first or second aspect.

Effect of the Invention

With the fat crystallization accelerator of the present invention, it is possible to accelerate fat crystallization in a short time during a production step of a fat composition of margarine, shortening, chocolate, or hard butter product to be used for confectionery production or bakery production, even when a palm-based fat or a transesterified fat which has a slow crystallization speed is used.

BEST MODE FOR CARRYING OUT THE INVENTION

The fat crystallization accelerator of the present invention is characterized by containing a sorbitan fatty acid ester having an esterification rate of 28 to 60%, preferably 28 to 50%, more preferably 30 to 45% and a sorbitol-type content of 20 to 40%, preferably 30 to 40%.

In the present invention, examples of the form of sorbitol to be used as a raw material for the sorbitan fatty acid ester include D-sorbitol in the form of white powders or grains or a D-sorbitol liquid containing about 50.0 to 70.0% by mass of D-sorbitol.

In addition, in the present invention, it is preferable that a constituent fatty acid of the sorbitan fatty acid ester is palmitic acid and/or stearic acid, and it is more preferable that the content of palmitic acid and/or stearic acid is 90% by mass or more in 100% by mass of the constituent fatty acid. It is possible to exhibit an excellent crystallization acceleration effect for a fat by using the sorbitan fatty acid ester having a fatty acid composition similar to a fatty acid composition that constitutes the fat.

A process for producing the sorbitan fatty acid ester to be used in the present invention is not particularly limited. For example, an esterification reaction between sorbitol and fatty acid can be carried out without a catalyst or with an acid catalyst or an alkali catalyst. It is preferable to carry out the esterification reaction with an alkali catalyst. Examples of the acid catalyst include concentrated sulfuric acid, p-toluenesulfonic acid, and the like. Examples of the alkali catalyst include potassium hydroxide, sodium hydroxide, potassium carbonate, sodium carbonate, and the like. The amount of the alkali catalyst used is about 0.01 to 1.0% by mass, preferably about 0.05 to 0.5% by mass, of a total amount of a fat composition (in terms of dried matter).

An apparatus for producing the sorbitan fatty acid ester to be used in the present invention is not particularly limited. It is possible to carry out the above-described esterification reaction by supplying sorbitol, a fatty acid, and a catalyst to an ordinary reaction vessel provided with a stirrer, a jacket for heating, a baffle plate, an inert gas injection tube, a water separator with a thermometer and a condenser; mixing the mixture with stirring; and heating the mixture at a predetermined temperature for a predetermined time while eliminating water generated by the esterification reaction under an arbitrary inert gas atmosphere such as nitrogen and carbon dioxide. A reaction temperature is ordinarily within a range of about 180° C. to 260° C., preferably about 200° C. to 250° C. A reaction pressure condition is under reduced pressure or ordinary pressure, and a reaction time is about 0.5 to 15 hours, preferably 1 to 3 hours. The end point of the reaction is ordinarily determined by measuring an acid value of the reaction mixture, and the acid value of about 10 or less is used as an indication of the end point.

After the termination of the esterification reaction, in the case of using a catalyst, the catalyst remaining in the reaction mixture may be neutralized. In doing so, in the case where the temperature of the esterification reaction is 200° C. or more, it is preferable to carry out the neutralization treatment after cooling the liquid temperature to about 180° C. to 200° C. Also, in the case where the reaction temperature is 200° C. or less, the neutralization treatment can be carried out at the unchanged temperature. After the neutralization, the mixture liquid is left to stand at the temperature, preferably for about 0.5 hours or more, more preferably about 1 to 10 hours. In the case where non-reacted sorbitol or a sorbitol intramolecular condensate is separated as a lower layer, it is preferable to eliminate the lower layer.

The sorbitan saturated fatty acid ester to be used in the present invention preferably has an esterification rate of 28 to 60%. The esterification rate (%) is calculated by the following expression. Here, an ester value and a hydroxyl vale are measured in accordance with [$2.3.3_{-1996}$ Ester Value] and [$2.3.6_{-1996}$ Hydroxyl Value] of "Standard Methods for the Analysis of Fats and Oils (I)" (edited by Japan Oil Chemists' Society).

Esterification rate (%)=ester value/(ester value+hydroxyl value)×100  [Expression 1]

In the case where the sorbitan fatty acid ester has an esterification rate of less than 28%, it is not preferable because the melting point of the sorbitan fatty acid ester to be obtained is high and the amount of a hydrophilic ester generated is large, and therefore, it is difficult to be dissolved in a fat, and such a sorbitan fatty acid ester is not suitable for use. Also, in the case where the sorbitan fatty acid ester has an esterification rate of more than 60%, it is not preferable because the fat crystallization accelerating effect is reduced.

The sorbitan saturated fatty acid ester to be used in the present invention preferably has a sorbitol-type content of 20 to 40%. The sorbitol-type content means the content (%) of sorbitol in 100% of alcohol (e.g. sorbitol, sorbitan, sorbide, etc.) which constitute the sorbitan fatty acid ester. In the case where the sorbitol-type content is less than 20%, it is not preferable because the fat crystallization accelerating effect is reduced. Also, in the case where the sorbitol-type content is more than 40%, it is not preferable because the amount of a hydrophilic ester generated is large, and therefore, it is difficult to be dissolved in a fat, and such a sorbitan fatty acid ester is not suitable for use.

The fat crystallization accelerator of the present invention is capable of exhibiting the effect of the present invention in a food product containing a fat, particularly in a fat composition of margarine, shortening, chocolate, or hard butter which requires the crystallization accelerating effect in a short time during a production step. Particularly in the case of a sheet-like plastic fat composition, since the crystallization is accelerated during a production step even when a large amount of palm oil or transesterified oil which has a slow crystallization speed is used, it is possible to obtain a sheet-like-plastic composition having good physical properties from a product outlet.

Further, the fat crystallization accelerator of the present invention is capable of increasing a solidification speed during a cooling step when used for chocolate or hard butter, thereby making it possible to shorten the cooling step.

In a method for using the fat crystallization accelerator of the present invention, the crystallization accelerating effect is exhibited when the fat crystallization accelerator is melted in a fat, and then the fat and the crystallization accelerator are completely molten with each other before subjecting to a crystallization step. In this case, it is possible to attain the crystallization accelerating effect by adding the crystallization accelerator of the present invention in an amount of 0.05 to 1.0% by mass, more preferably 0.1 to 0.6% by mass, with respect to the fat.

The degree of the fat crystallization acceleration is evaluated based on SFC. SFC is an abbreviation for Solid Fat Content and means a content (%) of a solid fat existing in a fat at a predetermined temperature. Therefore, it means that the larger the SFC value of the fat after a predetermined time has passed from the start of the cooling step (crystallization step), the faster the fat crystallization and the higher the crystallization accelerating effect.

Specifically, an evaluation test for the crystallization acceleration effect is carried out as follows. First, a sample obtained by completely dissolving a crystallization accelerator in a fat at 80° C. is uniformly poured into a special test tube and retained in a constant-temperature bath at 60° C. for 30 minutes. Next, the test tube containing a sample is transferred to a constant-temperature bath at 0° C., and, after a predetermined time is passed, SFC of the sample is measured by a nuclear magnetic resonance (NMR) device.

Also, the evaluation test for the crystallization acceleration effect is carried out by the following method. First, a sample obtained by completely dissolving a crystallization accelerator in a fat at 80° C. is uniformly poured into a special test tube and retained in a constant-temperature bath at 60° C. for 60 minutes. Next, the test tube containing a sample is transferred to a constant-temperature bath at 15° C. or 20° C., and, after a predetermined time is passed, SFC of the sample is measured by a nuclear magnetic resonance (NMR) device.

Examples of a fat contained in the fat-containing food product include plant fats such as palm oil, cocoa butter, palm oil, and palm kernel oil; and animal fats such as milk fat, beef tallow, lard, fish oil, and whale oil; and examples of other fats include a single fat or mixed fat of plant fats such as rapeseed oil, soybean oil, sunflower seed oil, cottonseed oil, peanut oil, rice bran oil, corn oil, safflower oil, olive oil, kapok oil, sesame oil, evening primrose oil, palm oil, sheer butter, sal butter, cocoa butter, coconut oil, and palm kernel oil and animal fats such as milk fat, beef tallow, lard, fish oil, and whale oil or processed fats obtained by being subjected to such as hardening, fractionation or transesterification thereof. Among these fats, the crystallization accelerator of the present invention is particularly suitably used for a palm-based fat cocoa butter, a transesterified fat, or the like, which has a slow crystallization speed. Examples of the palm-based fat include purified palm oil obtained by purifying natural palm oil and palm olein or palm stearin obtained by fractionating natural palm oil. The crystallization accelerator is particularly suitably used for a random transesterified fat in case of the transesterified fats.

EXAMPLES

Hereinafter, the present invention will be described in more details based on production examples, experimental examples, and examples.

Production Example 1

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 356 g (about 1.3 mol) of stearic acid (trade name: Stearic acid 65; stearic acid content: 65% by mass; palmitic acid content: 35% by mass; manufactured by Miyoshi Oil & Fat Co., Ltd.) was added, and 11 mL of 10 w/v % sodium hydroxide aqueous solution was added as a catalyst, followed by an esterification reaction under ordinary pressure in a nitrogen gas stream at 235° C. for about 1.5 hours until the acid value became 10 or less. The thus-obtained reaction product was cooled to obtain about 470 g of a sorbitan stearic acid ester (sample 1: esterification rate: 29%; sorbitol-type content: 36%).

Production Example 2

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 411 g (about 1.5 mol) of stearic acid (trade name: Stearic acid 65; manufactured by Miyoshi Oil & Fat Co., Ltd.) was added, and 11 mL of 10 w/v % sodium hydroxide aqueous solution was added as a catalyst, followed by an esterification reaction under ordinary pressure in a nitrogen gas stream at 235° C. for about 1.5 hours until the acid value became 10 or less. The thus-obtained reaction product was cooled to obtain about 520 g of a sorbitan stearic acid ester (sample 2: esterification rate: 32%; sorbitol-type content: 35%).

Production Example 3

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 493 g (about 1.8 mol) of stearic acid (trade name: Stearic acid 65; manufactured by Miyoshi Oil & Fat Co., Ltd.) was added, and 13 mL of 10 w/v % sodium hydroxide aqueous solution was added as a catalyst, followed by an esterification reaction under ordinary pressure in a nitrogen gas stream at 235° C. for about 2 hours until the acid value became 10 or less. The thus-obtained reaction product was cooled to obtain about 607 g of a sorbitan stearic acid ester (sample 3: esterification rate: 39 sorbitol-type content: 35%).

Production Example 4

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 548 g (about 2.0 mol) of stearic acid (trade name: Stearic acid 65; manufactured by Miyoshi Oil & Fat Co., Ltd.) was added, and 14 mL of 10 w/v % sodium hydroxide aqueous solution was added as a catalyst, followed by an esterification reaction under ordinary pressure in a nitrogen gas stream at 235° C. for about 2 hours until the acid value became 10 or less. The thus-obtained reaction product was cooled to obtain about 662 g of a sorbitan stearic acid ester (sample 4: esterification rate: 42%; sorbitol-type content: 34%).

Production Example 5

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 512 g (about 2.0 mol) of palmitic acid (trade name: Palmitic acid 98; palmitic acid content: 98% by mass; manufactured by Miyoshi Oil & Fat Co., Ltd.) was added, and 13 mL of 10 w/v % sodium hydroxide aqueous solution was added as a catalyst, followed by an esterification reaction under ordinary pressure in a nitrogen gas stream at 235° C. for about 2 hours until the acid value became 10 or less. The thus-obtained reaction product was cooled to obtain about 624 g of a sorbitan palmitic acid ester (sample 5: esterification rate: 42%; sorbitol-type content: 38%).

Production Example 6

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 575 g (about 2.1 mol) of stearic acid (trade name: Stearic acid 65; manufactured by Miyoshi Oil & Fat Co., Ltd.) was added, and 14 mL of 10 w/v % sodium hydroxide aqueous solution was added as a catalyst, followed by an esterification reaction under ordinary pressure in a nitrogen gas stream at 235° C. for about 2 hours until the acid value became 10 or less. The thus-obtained reaction product was cooled to obtain about 685 g of a sorbitan stearic acid ester (sample 6: esterification rate: 45%; sorbitol-type content: 34%).

Production Example 7

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 538 g (about 2.1 mol) of palmitic acid (trade name: Palmitic acid 98; manufactured by Miyoshi Oil & Fat Co., Ltd.) was added, and 14 mL of 10 w/v % sodium hydroxide aqueous solution was added as a catalyst, followed by an esterification reaction under ordinary pressure in a nitrogen gas stream at 235° C. for about 2 hours until the acid value became 10 or less. The thus-obtained reaction product was cooled to obtain about 650 g of a sorbitan palmitic acid ester (sample 7: esterification rate: 45%; sorbitol-type content: 37%).

Production Example 8

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 603 g (about 2.2 mol) of stearic acid (trade name: Stearic acid 65; manufactured by Miyoshi Oil & Fat Co., Ltd.) was added, and 15 mL of 10 w/v % sodium hydroxide aqueous solution was added as a catalyst, followed by an esterification reaction under ordinary pressure in a nitrogen gas stream at 235° C. for about 2 hours until the acid value became 10 or less. The thus-obtained reaction product was cooled to obtain about 710 g of a sorbitan stearic acid ester (sample 8: esterification rate: 47%; sorbitol-type content: 34%).

Production Example 9

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 563 g (about 2.2 mol) of palmitic acid (trade name: Palmitic acid 98; manufactured by Miyoshi Oil & Fat Co., Ltd.) was added, and 14 mL of 10 w/v % sodium hydroxide aqueous solution was added as a catalyst, followed by an esterification reaction under ordinary pressure in a nitrogen gas stream at 235° C. for about 2 hours until the acid value became 10 or less. The thus-obtained reaction product was cooled to obtain about 675 g of a sorbitan palmitic acid ester (sample 9: esterification rate: 48%; sorbitol-type content: 37%).

Production Example 10

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 630 g (about 2.3 mol) of stearic acid (trade name: Stearic acid 65; manufactured by Miyoshi Oil & Fat Co., Ltd.) was added, and 15 mL of 10 w/v % sodium hydroxide aqueous solution was added as a catalyst, followed by an esterification reaction under ordinary pressure in a nitrogen gas stream at 235° C. for about 2 hours until the acid value became 10 or less. The thus-obtained reaction product was cooled to obtain about 738 g of a sorbitan stearic acid ester (sample 10: esterification rate: 49%; sorbitol-type content: 32%).

Production Example 11

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 589 g (about 2.3 mol) of palmitic acid (trade name: Palmitic acid 98; manufactured by Miyoshi Oil & Fat Co., Ltd.) was added, and 14 mL of 10 w/v % sodium hydroxide aqueous solution was added as a catalyst, followed by an esterification reaction under ordinary pressure in a nitrogen gas stream at 235° C. for about 2 hours until the acid value became 10 or less. The thus-obtained reaction product was cooled to obtain about 696 g of a sorbitan palmitic acid ester (sample 11: esterification rate: 51%; sorbitol-type content: 348%).

Production Example 12

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 256 g (about 1.0 mol) of palmitic acid (trade name: Palmitic acid 98; manufactured by Miyoshi Oil & Fat Co., Ltd.) was added, and 11 mL of 10 w/v % sodium hydroxide aqueous solution was added as a catalyst, followed by an esterification reaction under ordinary pressure in a nitrogen gas stream at 235° C. for about 1.5 hours until the acid value became 10 or less. The thus-obtained reaction product was cooled to obtain about 370 g of a sorbitan palmitic acid ester (sample 12: esterification rate: 26%; sorbitol-type content: 44%).

Production Example 13

In a 1 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 301 g (about 1.1 mol) of stearic acid (trade name: Stearic acid 65; manufactured by Miyoshi Oil & Fat Co., Ltd.) was added, and 11 mL of 10 w/v % sodium hydroxide aqueous solution was added as a catalyst, followed by an esterification reaction under ordinary pressure in a nitrogen gas stream at 235° C. for about 1.5 hours until the acid value became 10 or less. The thus-obtained reaction product was cooled to obtain about 415 g of a sorbitan stearic acid ester (sample 13: esterification rate: 27%; sorbitol-type content: 39%).

Production Example 14

In a 2 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 767 g (about 2.8 mol) of stearic acid (trade name: Stearic acid 65; manufactured by Miyoshi Oil & Fat Co., Ltd.) was added, and 5 mL of 10 w/v % sodium hydroxide aqueous solution was added as a catalyst, followed by an esterification reaction under ordinary pressure in a nitrogen gas stream at 235° C. for about 2.5 hours until the acid value became 10 or less. The thus-obtained reaction product was cooled to obtain about 865 g of a sorbitan stearic acid ester (sample 14: esterification rate: 66%; sorbitol-type content: 24%).

Production Example 15

In a 2 L four-necked flask to which a stirrer, a thermometer, a gas injection tube, and a water separator were attached, 260 g (about 1.0 mol) of sorbitol (trade name: Sorbitol S; manufactured by Nikken Chemical and Synthetic Industry Co., Ltd.) was added, followed by dehydration under reduced pressure of about 400 Pa at 75° C. for about 10 minutes. Subsequently, 822 g (about 3.0 mol) of stearic acid (trade name: Stearic acid 65; manufactured by Miyoshi Oil & Fat Co., Ltd.) was added, and 5 mL of 10 w/v % sodium hydroxide aqueous solution was added as a catalyst, followed by an esterification reaction under ordinary pressure in a nitrogen gas stream at 235° C. for about 3 hours until the acid value became 10 or less. The thus-obtained reaction product was cooled to obtain about 920 g of a sorbitan stearic acid ester (sample 15: esterification rate: 71%; sorbitol-type content: 18%).

[Experimental Example of Sorbitol-Type Content]

The sorbitol-type content of each of the sorbitan fatty acid esters obtained by Production Examples 1 to 15 (samples 1 to 15) and commercially available products A and B described later was measured by the following method.

First, the sorbitan fatty acid ester was decomposed into a fatty acid and polyol by decomposition through saponification. More specifically, 2.0 g of a test sample was measured and placed in a flask for saponification, followed by adding thereto 30 mL of 0.5 mol/L potassium hydroxide-ethanol standard liquid. A condenser was attached to the flask, and the flask was mildly heated with intermittent shaking for about 1 hour by adjusting a temperature within a range of about 70° C. to 80° C. while preventing the refluxing ethanol from reaching to an upper end of the condenser, and then 50 mL of water was added. After that, the thus-obtained contents were transferred to a separating funnel, and 100 mL of hexane and about 5 mL of 35% hydrochloric acid were added, followed by shaking the separating funnel and still standing. Subsequently, the separated lower layer was transferred to another separating funnel, and 50 mL of hexane was added to carry out the same treatment. The separated lower layer was collected to be placed in a beaker for neutralization through pH adjustment with a 0.5 mol/L potassium hydroxide solution, and the beaker was left to stand still in a circulation drier at 60° C. for dehydration. After dehydration completely, about 10 mL of methanol and a small amount of Sodium sulfate decahydrate were added, followed by stirring, and the contents underwent natural filtration. The thus-obtained filtrate was transferred to a flask, and the methanol was removed by using an evaporator.

Next, the thus-obtained concentrate was formed into TMS by an ordinary method, and polyol composition analysis was carried out by using GC (gas chromatography). GC was carried out under the below-specified GC analysis conditions. After the analysis, a peak area of each of peaks corresponding to components of the test sample recorded on a chromatogram by a data processing device was measured by using an integrator, and a sorbitol-type content in alcohol composition was determined as an area percentage based on the measured peak area.

<GC Analysis Conditions>
Apparatus:
    Gas chromatograph (model: GC-17A; manufactured by Shimadzu Corporation)
    Data processing apparatus (model: C-R7A plus; manufactured by Shimadzu Corporation)
    Column (model: DB-5HT; manufactured by Agilent Technologies)
Column Oven Conditions:
    Initial temperature: 120° C. (1 minute)
    Temperature increase rate: 8° C./min.
    Final temperature: 340° C. (25 minutes)
    Detector temperature: 330° C.
    Inlet temperature: 330° C.
Sample injection amount: 3 µL
Detector: FID (hydrogen flame ionization detector)
Career gas: helium 75 kPa
Split ratio: 1:80

(Crystallization Speed Comparison Test 1)

0.5% by mass of each of the sorbitan fatty acid esters produced in Production Examples 1 to 15 (samples 1 to 15) and the commercially available sorbitan fatty acid esters (commercially available products A and B) was added to purified palm oil to be completely dissolved at a temperature of 80° C., and each sample was retained in a constant-temperature bath at 60° C. for 30 minutes. After that, each sample was transferred to a constant-temperature bath at 0° C., and after 20 minutes, SFC of each of the samples was measured.

The commercially available products A and B were as follows.

Commercially available product A: sorbitan stearic acid ester (trade name: Poem S-300V; esterification rate: 31%; sorbitol-type content: 57%; manufactured by Riken Vitamin Co., Ltd.)

Commercially available product B: sorbitan stearic acid ester (trade name: Poem S-60V; esterification rate: 37%; sorbitol-type content: 13%; manufactured by Riken Vitamin Co., Ltd.)

As a result of the test, it was confirmed that it was possible to achieve the acceleration of the palm oil crystallization by adding the sorbitan fatty acid esters of the samples 1 to 11. Meanwhile, the sorbitan fatty acid esters of the samples 12 and 13 and the commercially available product A were unsuitable for use since it was difficult to completely melt them in a fat by heating. The results were shown in Table 1.

thereby, an transesterified fat A was obtained. To the transesterified fat A, 0.5% by mass of each of the sorbitan fatty acid esters produced in Production Examples 1 to 15 (samples 1 to 15) and the commercially available products A and B was added to be completely dissolved at a temperature of 80° C., and each sample was retained in a constant-temperature bath at 60° C. for 30 minutes. After that, each sample was transferred to a constant-temperature bath at 0° C., and, after 3 minutes, SFC of each of the samples was measured.

TABLE 1

| | | Esterification rate | Sorbitol-type content | Fatty acid | SFC (20 minutes) |
|---|---|---|---|---|---|
| Comparative Example 1 | | Cont. (palm oil only) | | | 44.4 |
| Example 1 | Sample 1 | 29% | 36% | Palmitic acid/stearic acid | 48.4 |
| Example 2 | Sample 2 | 32% | 35% | Palmitic acid/stearic acid | 51.2 |
| Example 3 | Sample 3 | 39% | 35% | Palmitic acid/stearic acid | 51.2 |
| Example 4 | Sample 4 | 42% | 34% | Palmitic acid/stearic acid | 52.0 |
| Example 5 | Sample 5 | 42% | 38% | Palmitic acid | 52.6 |
| Example 6 | Sample 6 | 45% | 34% | Palmitic acid/stearic acid | 51.7 |
| Example 7 | Sample 7 | 45% | 37% | Palmitic acid | 52.3 |
| Example 8 | Sample 8 | 47% | 34% | Palmitic acid/stearic acid | 51.7 |
| Example 9 | Sample 9 | 48% | 37% | Palmitic acid | 52.9 |
| Example 10 | Sample 10 | 49% | 32% | Palmitic acid/stearic acid | 51.3 |
| Example 11 | Sample 11 | 51% | 34% | Palmitic acid | 52.9 |
| Comparative Example 2 | Sample 12 | 26% | 44% | Palmitic acid | Unsuitable for use |
| Comparative Example 3 | Sample 13 | 27% | 39% | Palmitic acid/stearic acid | Unsuitable for use |
| Comparative Example 4 | Sample 14 | 66% | 24% | Palmitic acid/stearic acid | 47.7 |
| Comparative Example 5 | Sample 15 | 71% | 18% | Palmitic acid/stearic acid | 47.3 |
| Comparative Example 6 | Commercially available product A | 31% | 57% | Palmitic acid/stearic acid | Unsuitable for use |
| Comparative Example 7 | Commercially available product B | 37% | 13% | Palmitic acid/stearic acid | 47.8 |

(Crystallization Speed Comparison Test 2)

50 parts of palm oil, 40 parts of palm kernel oil, and 10 parts of palm stearin were mixed, and 0.3 part of a metal catalyst (sodium methoxide) was added to the mixture, and then subjecting the mixture to a non-selective transesterification reaction under vacuum at 80° C. for 1 hour followed by purifying the mixture in accordance with an ordinary method, and As a result of the test, it was confirmed that it was possible to achieve the acceleration of the transesterified fat A crystallization by adding the sorbitan fatty acid esters of the samples 1 to 11. Meanwhile, the sorbitan fatty acid esters of the samples 12 and 13 and the commercially available product A were unsuitable for use since it was difficult to completely melt them in a fat by heating. The results were shown in Table 2.

TABLE 2

| | | Esterification rate | Sorbitol-type content | Fatty acid | SFC (3 minutes) |
|---|---|---|---|---|---|
| Comparative Example 8 | | Cont. (transesterified fat A only) | | | 29.7 |
| Example 12 | Sample 1 | 29% | 36% | Palmitic acid/stearic acid | 45.8 |
| Example 13 | Sample 2 | 32% | 35% | Palmitic acid/stearic acid | 45.2 |
| Example 14 | Sample 3 | 39% | 35% | Palmitic acid/stearic acid | 44.0 |
| Example 15 | Sample 4 | 42% | 34% | Palmitic acid/stearic acid | 42.8 |
| Example 16 | Sample 5 | 42% | 38% | Palmitic acid | 45.2 |

TABLE 2-continued

| | | Esterification rate | Sorbitol-type content | Fatty acid | SFC (3 minutes) |
|---|---|---|---|---|---|
| Example 17 | Sample 6 | 45% | 34% | Palmitic acid/stearic acid | 40.9 |
| Example 18 | Sample 7 | 45% | 37% | Palmitic acid | 44.6 |
| Example 19 | Sample 8 | 47% | 34% | Palmitic acid/stearic acid | 38.8 |
| Example 20 | Sample 9 | 48% | 37% | Palmitic acid | 44.6 |
| Example 21 | Sample 10 | 49% | 32% | Palmitic acid/stearic acid | 37.1 |
| Example 22 | Sample 11 | 51% | 34% | Palmitic acid | 41.8 |
| Comparative Example 9 | Sample 12 | 26% | 44% | Palmitic acid | Unsuitable for use |
| Comparative Example 10 | Sample 13 | 27% | 39% | Palmitic acid/stearic acid | Unsuitable for use |
| Comparative Example 11 | Sample 14 | 66% | 24% | Palmitic acid/stearic acid | 30.5 |
| Comparative Example 12 | Sample 15 | 71% | 18% | Palmitic acid/stearic acid | 29.7 |
| Comparative Example 13 | Commercially available product A | 31% | 57% | Palmitic acid/stearic acid | Unsuitable for use |
| Comparative Example 14 | Commercially available product B | 37% | 13% | Palmitic acid/stearic acid | 34.8 |

(Crystallization Speed Comparison Test 3)

50 parts of coconut oil, 40 parts of palm stearin, and 10 parts of extremely hardened rapeseed oil were mixed, and 0.3 part of a metal catalyst (sodium methoxide) was added to the mixture, and then subjecting the mixture to a non-selective transesterification reaction under vacuum at 80° C. for 1 hour followed by purifying the mixture in accordance with an ordinary method, and thereby, an transesterified fat B was obtained. To the transesterified fat B, 0.5% by mass of each of the sorbitan fatty acid esters produced in Production Examples 1 to 15 (samples 1 to 15) and the commercially available products A and B was added to be completely dissolved at a temperature of 80° C., and each sample was retained in a constant-temperature bath at 60° C. for 30 minutes. After that, each sample was transferred to a constant-temperature bath at 0° C., and, after 3 minutes, SFC of each of the samples was measured.

As a result of the test, it was confirmed that it was possible to achieve the acceleration of the transesterified fat B crystallization by adding the sorbitan fatty acid esters of the samples 1 to 10. Meanwhile, the sorbitan fatty acid esters of the samples 12 and 13 and the commercially available product A were unsuitable for use since it was difficult to completely melt them in a fat by heating. The results were shown in Table 3.

TABLE 3

| | | Esterification rate | Sorbitol-type content | Fatty acid | SFC (3 minutes) |
|---|---|---|---|---|---|
| Comparative Example 15 | | Cont. (transesterified fat B only) | | | 45.0 |
| Example 23 | Sample 1 | 29% | 36% | Palmitic acid/stearic acid | 57.8 |
| Example 24 | Sample 2 | 32% | 35% | Palmitic acid/stearic acid | 56.9 |
| Example 25 | Sample 3 | 39% | 35% | Palmitic acid/stearic acid | 55.6 |
| Example 26 | Sample 4 | 42% | 34% | Palmitic acid/stearic acid | 51.0 |
| Example 27 | Sample 5 | 42% | 38% | Palmitic acid | 54.3 |
| Example 28 | Sample 6 | 45% | 34% | Palmitic acid/stearic acid | 50.5 |
| Example 29 | Sample 7 | 45% | 37% | Palmitic acid | 54.3 |
| Example 30 | Sample 8 | 47% | 34% | Palmitic acid/stearic acid | 47.8 |
| Example 31 | Sample 9 | 48% | 37% | Palmitic acid | 50.3 |
| Example 32 | Sample 10 | 49% | 32% | Palmitic acid/stearic acid | 47.8 |
| Example 33 | Sample 11 | 51% | 34% | Palmitic acid | 46.1 |
| Comparative Example 16 | Sample 12 | 26% | 44% | Palmitic acid | Unsuitable for use |
| Comparative Example 17 | Sample 13 | 27% | 39% | Palmitic acid/stearic acid | Unsuitable for use |
| Comparative Example 18 | Sample 14 | 66% | 24% | Palmitic acid/stearic acid | 45.2 |
| Comparative | Sample 15 | 71% | 18% | Palmitic acid/ | 45.0 |

TABLE 3-continued

| | | Esterification rate | Sorbitol-type content | Fatty acid | SFC (3 minutes) |
|---|---|---|---|---|---|
| Example 19 | | | | stearic acid | |
| Comparative Example 20 | Commercially available product A | 31% | 57% | Palmitic acid/stearic acid | Unsuitable for use |
| Comparative Example 21 | Commercially available product B | 37% | 13% | Palmitic acid/stearic acid | 46.1 |

(Experimental Production of Sheet-Like Margarine)

Sheet-like margarines were prepared according to the compositions shown in Table 4, and the physical properties thereof at a sheet nozzle outlet immediately after the preparation were evaluated.

The transesterified fat C in Table 4 was a fat obtained by following process:
30 parts of palm oil, 65 parts of palm stearin, and 5 parts of extremely hardened rapeseed oil were mixed, and 0.3 part of a metal catalyst (sodium methoxide) was added to the mixture, and then subjecting the mixture to a non-selective transesterification reaction under vacuum at 80° C. for 1 hour followed by purifying the mixture in accordance with an ordinary method, and thereby, an transesterified fat C was obtained.

The measurement of hardness was carried out by using a rheometer with a plunger having a diameter of 10 mm at a table speed of 5 cm/min.

mixtures was poured into a ring (inner diameter 15.9/19.8 mm; height: 6.4 mm) for measuring a softening point (ring and ball method), followed by solidification in a constant-temperature oven at 0° C. for 2 hours.

After the solidification, the ring was placed at the center of filter paper (No. 2; diameter: 125 mm) and left to stand still in a constant-temperature oven at 30° C. for 24 hours.

After the still standing, an amount of the fat penetrated from inside the ring to the filter paper was measured to determine a penetration ratio.

The commercially available products C, D, E, and F were as follows.

Commercially available product C: sorbitan stearic acid ester (trade name: Poem S-65V; esterification rate: 72%; sorbitol-type content: 29%; manufactured by Riken Vitamin Co., Ltd.)

TABLE 4

| | Comparative Example 22 | Example 34 | Example 35 | Comparative Example 23 | Comparative Example 24 |
|---|---|---|---|---|---|
| Sorbitan fatty acid ester | Not added | Sample 6 | Sample 6 | Sample 15 | Commercially available product B |
| | | 0.06% | 0.2% | 0.2% | 0.2% |
| Transesterified fat A | | | 17% | | |
| Transesterified fat C | | | 15% | | |
| Palm oil | | | 35% | | |
| Soybean oil | | | 16% | | |
| Salt | | | 1% | | |
| Water | | | 16% | | |
| Lecithin | | | 0.3% | | |
| Monoglycerin fatty acid ester | | | 0.1% | | |
| Hardness at outlet; rheometer value (g) | 120 | 160 | 180 | 125 | 140 |

As a result of the preparation of sheet-like margarines, Examples 34 and 35 to which the sample 6 was added exhibited satisfactory physical properties of sufficient hardness and firmness as a state at the outlet owing to the acceleration of crystallization. Meanwhile, a state at the outlet of each of Comparative Examples 22 to 24 was soft due to insufficient crystallization, and it was difficult to obtain a product in the form of a sheet.

(Migration Suppression Effect Comparison Test 1)

0.5% by mass of each of the sorbitan fatty acid ester produced in Production Example 6 (sample 6) and commercially available products B, C, D, E, and F was added to the hardened oil (fat D), which is obtained by hydrogenating the palm mid-fraction to the melting point of 36° C., to be completely dissolved at a temperature of 85° C., and 1 g of each of the Commercially available product D: sorbitan behenic acid ester (trade name: Poem B-150; esterification rate: 67%; sorbitol-type content: 24%; manufactured by Riken Vitamin Co., Ltd.)

Commercially available product E: polyglycerin fatty acid ester (trade name: Poem J-46B; manufactured by Riken Vitamin Co., Ltd.)

Commercially available product F: sucrose fatty acid ester (trade name: Sugar ester P-170; manufactured by Mitsubishi-Kagaku Foods Corporation)

As a result of the test, the migration suppression effect achieved by adding the sorbitan fatty acid ester of the sample 6 was confirmed such that the migration of the fat to the filter paper from inside the ring was suppressed and the penetration ratio was low. The results are shown in Table 5.

TABLE 5

| | | Esterification rate | Sorbitol-type content | Fatty acid | Penetration rate (%) |
|---|---|---|---|---|---|
| Comparative Example 25 | | Cont. (fat D only) | | | 25.0 |
| Example 36 | Sample 6 | 45% | 34% | Palmitic acid/stearic acid | 16.6 |
| Comparative Example 26 | Commercially available product B | 37% | 13% | Palmitic acid/stearic acid | 23.5 |
| Comparative Example 27 | Commercially available product C | 72% | 29% | Palmitic acid/stearic acid | 24.5 |
| Comparative Example 28 | Commercially available product D | 67% | 24% | Behenic acid | 16.0 |
| Comparative Example 29 | Commercially available product E | | | Polyglycerin fatty acid ester | 24.0 |
| Comparative Example 30 | Commercially available product F | | | Sucrose fatty acid ester | 15.3 |

(Migration Suppression Effect Comparison Test 2)

0.5% by mass of each of the sorbitan fatty acid ester produced in Production Example 6 (sample 6) and the commercially available products B, C, D, E, and F was added to the fat D to be completely dissolved at a temperature of 85° C., and 50 g of each of the mixtures was poured into a plastic cup having an inner diameter of 65 mm and a height of 40 mm, followed by solidification in a constant-temperature oven at 0° C. for 2 hours.

After the solidification, filter paper (No. 2; width: 10 mm; height: 200 mm) was perpendicularly placed on the surface of the cup and left to stand still in a constant-temperature oven at 30° C. for 24 hours. After the still standing, the amount (height) of the fat penetrated from the cup to the filter paper was measured.

As a result of the test, the migration suppression effect achieved by adding the sorbitan fatty acid ester of the sample 6 was confirmed such that the migration of the fat to the filter paper from the cup was suppressed and the height of the fat penetrated to the filter paper was low. The results were shown in Table 6.

(Crystallization Speed Comparison Tests 4 and 5)

1.0% by mass of each of the sorbitan fatty acid ester produced in Production Example 6 (sample 6) and the commercially available products B, D, E, F, and G was added to a fat E obtained by mixing 90 parts of the transesterified fat B and 10 parts of palm olein (iodine value: 67) to be completely dissolved at a temperature of 85° C., and each sample was retained in a constant-temperature bath at 60° C. for 60 minutes. After that, each sample was transferred to a constant-temperature bath at 15° C. or 20° C., and, after 6 minutes, SFC of each of the samples was measured.

The commercially available product G was as follows. Commercially available product G: glycerin fatty acid ester (trade name: Poem B-100; manufactured by Riken Vitamin Co., Ltd.)

As a result of the test, the acceleration of the fat E crystallization achieved by the addition of the sorbitan fatty acid ester of the sample 6 was confirmed in both of 15° C. cooling and 20° C. cooling. The results were shown in Table 7.

TABLE 6

| | | Esterification rate | Sorbitol-type content | Fatty acid | Height (mm) |
|---|---|---|---|---|---|
| Comparative Example 31 | | Cont. (fat D only) | | | 76.3 |
| Example 37 | Sample 6 | 45% | 34% | Palmitic acid/stearic acid | 48.7 |
| Comparative Example 32 | Commercially available product B | 37% | 13% | Palmitic acid/stearic acid | 55.5 |
| Comparative Example 33 | Commercially available product C | 72% | 29% | Palmitic acid/stearic acid | 76.3 |
| Comparative Example 34 | Commercially available product D | 67% | 24% | Behenic acid | 69.0 |
| Comparative Example 35 | Commercially available product E | | | Polyglycerin fatty acid ester | 70.0 |
| Comparative Example 36 | Commercially available product F | | | Sucrose fatty acid ester | 70.3 |

TABLE 7

(15° C. cooling)

| | | Esterification rate | Sorbitol-type content | Fatty acid | SFC (6 minutes) |
|---|---|---|---|---|---|
| Comparative Example 37 | | Cont. (fat E only) | | | 25.5 |
| Example 38 | Sample 6 | 45% | 34% | Palmitic acid/stearic acid | 45.7 |
| Comparative Example 38 | Commercially available product B | 37% | 13% | Palmitic acid/stearic acid | 42.3 |
| Comparative Example 39 | Commercially available product D | 67% | 24% | Behenic acid | 30.0 |
| Comparative Example 40 | Commercially available product E | Polyglycerin fatty acid ester | | | 37.0 |
| Comparative Example 41 | Commercially available product F | Sucrose fatty acid ester | | | 42.1 |
| Comparative Example 42 | Commercially available product G | Glycerin fatty acid ester | | | 40.3 |

TABLE 8

(20° C. cooling)

| | | Esterification rate | Sorbitol-type content | Fatty acid | SFC (6 minutes) |
|---|---|---|---|---|---|
| Comparative Example 43 | | Cont. (fat E only) | | | 14.3 |
| Example 39 | Sample 6 | 45% | 34% | Palmitic acid/stearic acid | 32.7 |
| Comparative Example 44 | Commercially available product B | 37% | 13% | Palmitic acid/stearic acid | 28.9 |
| Comparative Example 45 | Commercially available product D | 67% | 24% | Behenic acid | 14.9 |
| Comparative Example 46 | Commercially available product E | Polyglycerin fatty acid ester | | | 19.9 |
| Comparative Example 47 | Commercially available product F | Sucrose fatty acid ester | | | 22.7 |
| Comparative Example 48 | Commercially available product G | Glycerin fatty acid ester | | | 25.7 |

Figure 1:
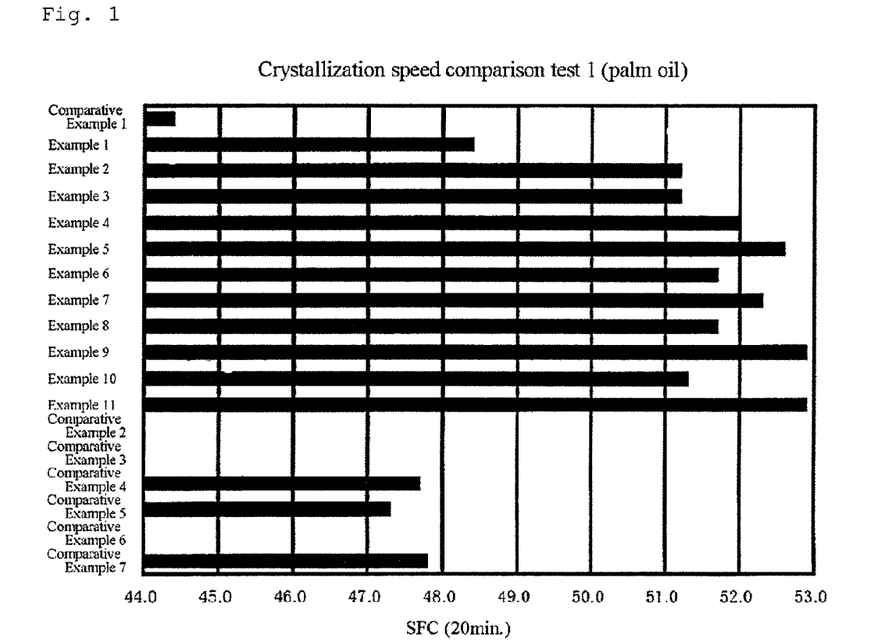
FIG. 1 is a graph showing the results of crystallization speed comparison test 1.
Figure 2:
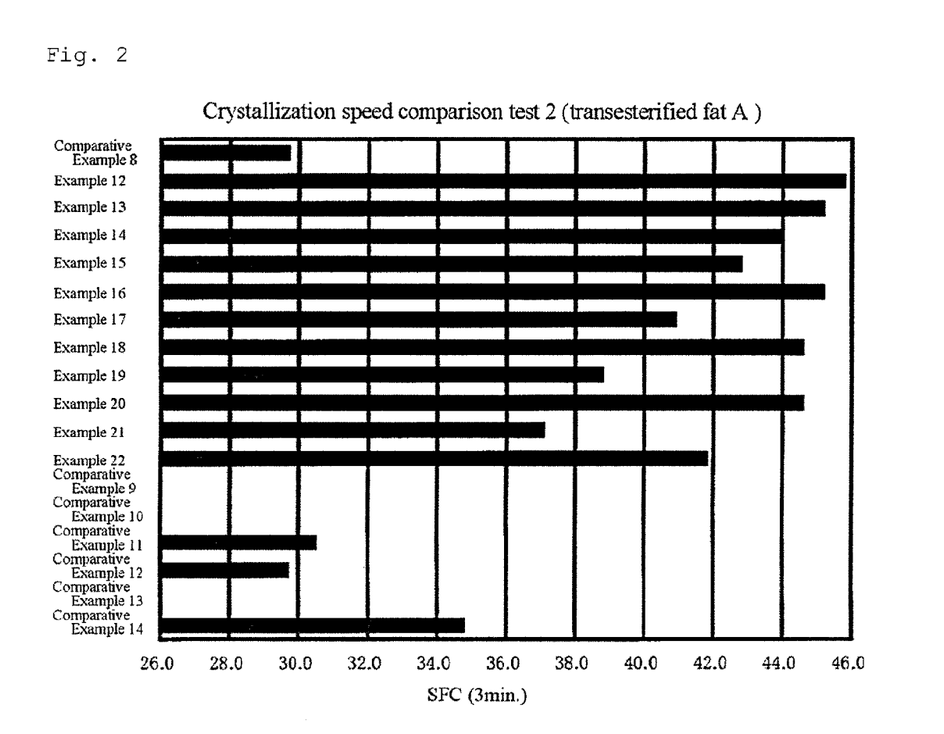
FIG. 2 is a graph showing the results of crystallization speed comparison test 2.
Figure 3:
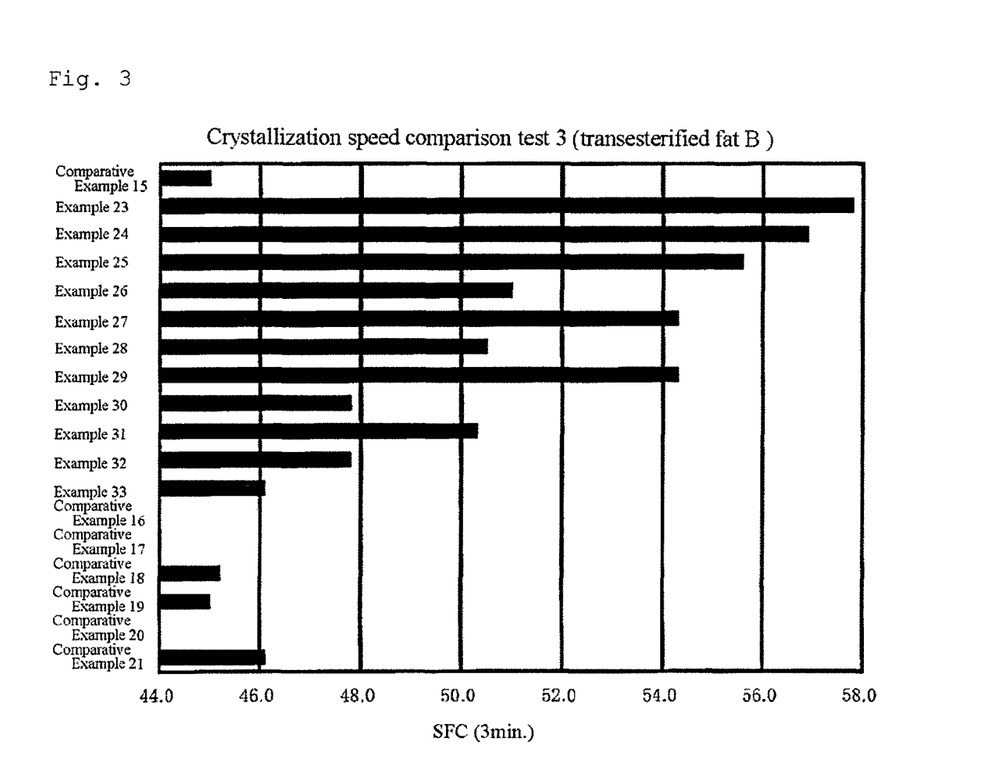
FIG. 3 is a graph showing the results of crystallization speed comparison test 3.
Figure 4:
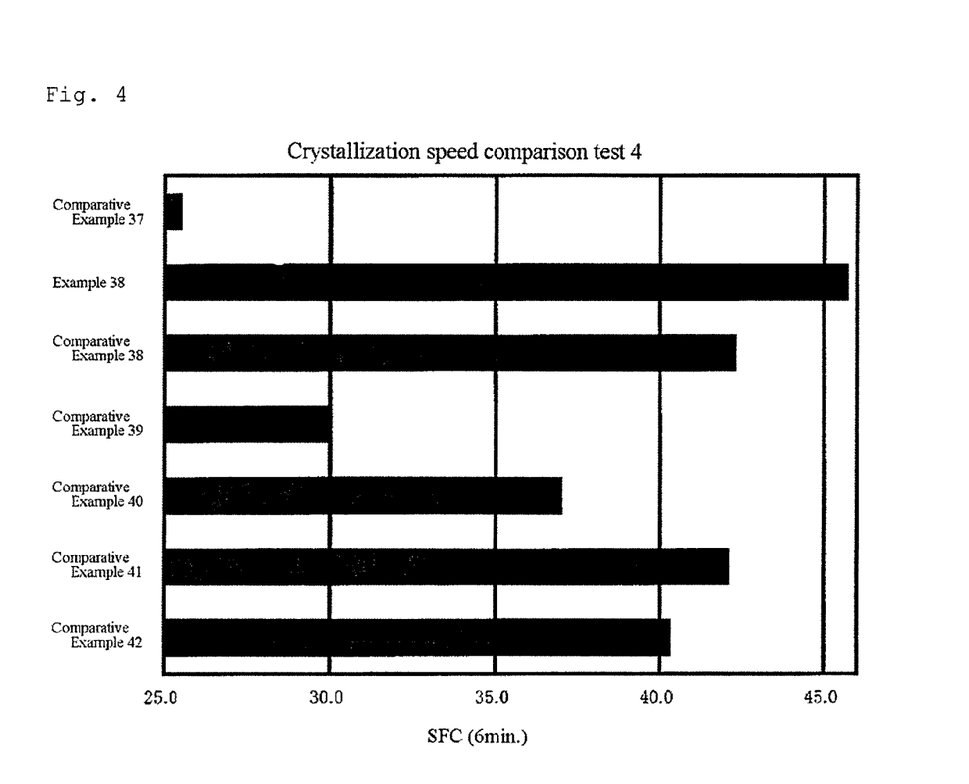
FIG. 4 is a graph showing the results of crystallization speed comparison test 4.
Figure 5:
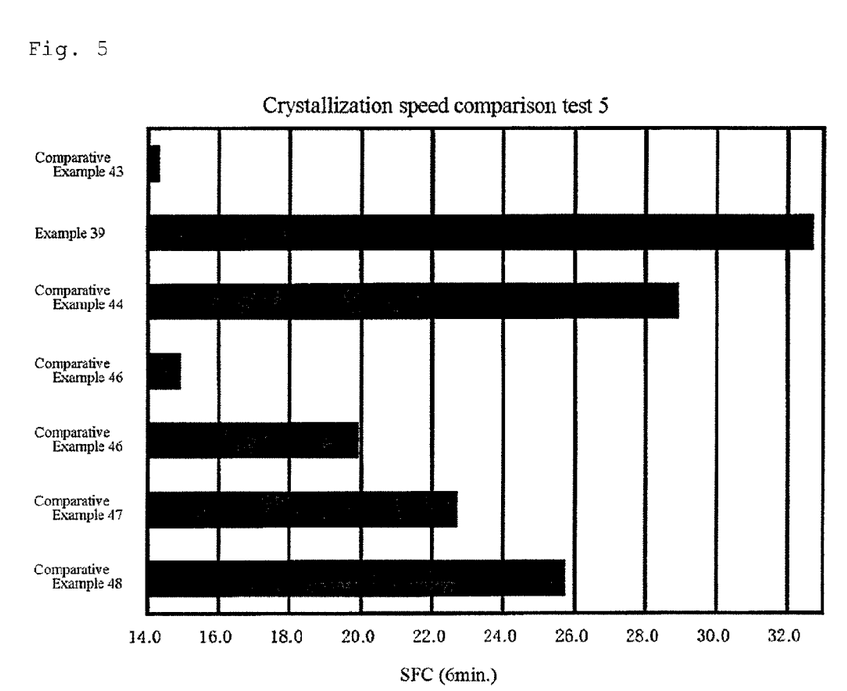
FIG. 5 is a graph showing the results of crystallization speed comparison test 5.

The invention claimed is:

1. A fat crystallization accelerator comprising a sorbitan fatty acid ester, the sorbitan fatty acid ester having an esterification rate of 28 to 60% and a sorbitol-type content of 20 to 40%,
    wherein the sorbitan fatty acid ester comprises a content of palmitic acid and/or stearic acid in 100% by mass of a constituent fatty acid in the sorbitan fatty acid ester of 90% by mass or more.

2. A fat composition comprising the crystallization accelerator according to claim 1.

\* \* \* \* \*